United States Patent

McKay et al.

[11] 3,891,522
[45] June 24, 1975

[54] HYDROMETALLURGICAL PROCESS FOR TREATING COPPER-IRON SULPHIDES

[75] Inventors: Donald R. McKay; Godefridus M. Swinkels, both of Rossland, Canada

[73] Assignee: Cominco Ltd., Trail, Canada

[22] Filed: Jan. 31, 1974

[21] Appl. No.: 438,314

Related U.S. Application Data

[63] Continuation-in-part of Ser. No. 229,737, Feb. 28, 1972, abandoned.

[52] U.S. Cl. .............. 204/108; 423/23; 423/36; 423/37; 423/48; 423/57; 423/146; 423/147; 423/150; 423/567; 75/101 R; 75/108; 75/115; 75/117
[51] Int. Cl. ... C22d 1/16; C22b 15/08; C22b 15/12; C01g 3/12
[58] Field of Search ........... 423/37, 567, 23, 36, 48, 423/146, 147, 150; 75/101 R, 115, 117, 108; 204/108

[56] References Cited
UNITED STATES PATENTS

| | | | |
|---|---|---|---|
| 2,609,272 | 9/1952 | Udy | 423/36 X |
| 3,053,651 | 9/1962 | McGauley | 75/101 R |
| 3,816,105 | 6/1974 | McKay et al. | 75/115 |

FOREIGN PATENTS OR APPLICATIONS

| | | | |
|---|---|---|---|
| 520,252 | 1/1956 | Canada | 75/117 |
| 547,012 | 10/1957 | Canada | |

OTHER PUBLICATIONS

Jacobson "Encyclopedia of Chemical Reactions," Reinhold, N.Y., 1949.

*Primary Examiner*—Herbert T. Carter

[57] ABSTRACT

A hydrometallurgical process for the activation of copper-iron sulphides and for the extraction of copper values and sulphur in elemental form from said activated copper-iron sulphides. The sulphides are subjected to an activation leach with metallic copper and an acidic solution containing sulphuric acid whereby insoluble simple copper sulphide and a solution of ferrous sulphate are obtained. In a preferred embodiment of the process the iron in the solution, after a liquid-solids separation, is oxidized and hydrolysed to precipitate the iron, which is removed from the process, and to regenerate acid solution containing sulphuric acid which is returned to the activation step. The copper sulphide is treated with an oxygen-bearing gas and recovered sulphuric acid in a multiplestage oxidizing leach to oxidize the sulphide sulphur to elemental sulphur and to liberate the copper as cupric ion for subsequent recovery as metallic copper. Sulphuric acid is recovered and returned to the oxidizing leach.

37 Claims, 1 Drawing Figure

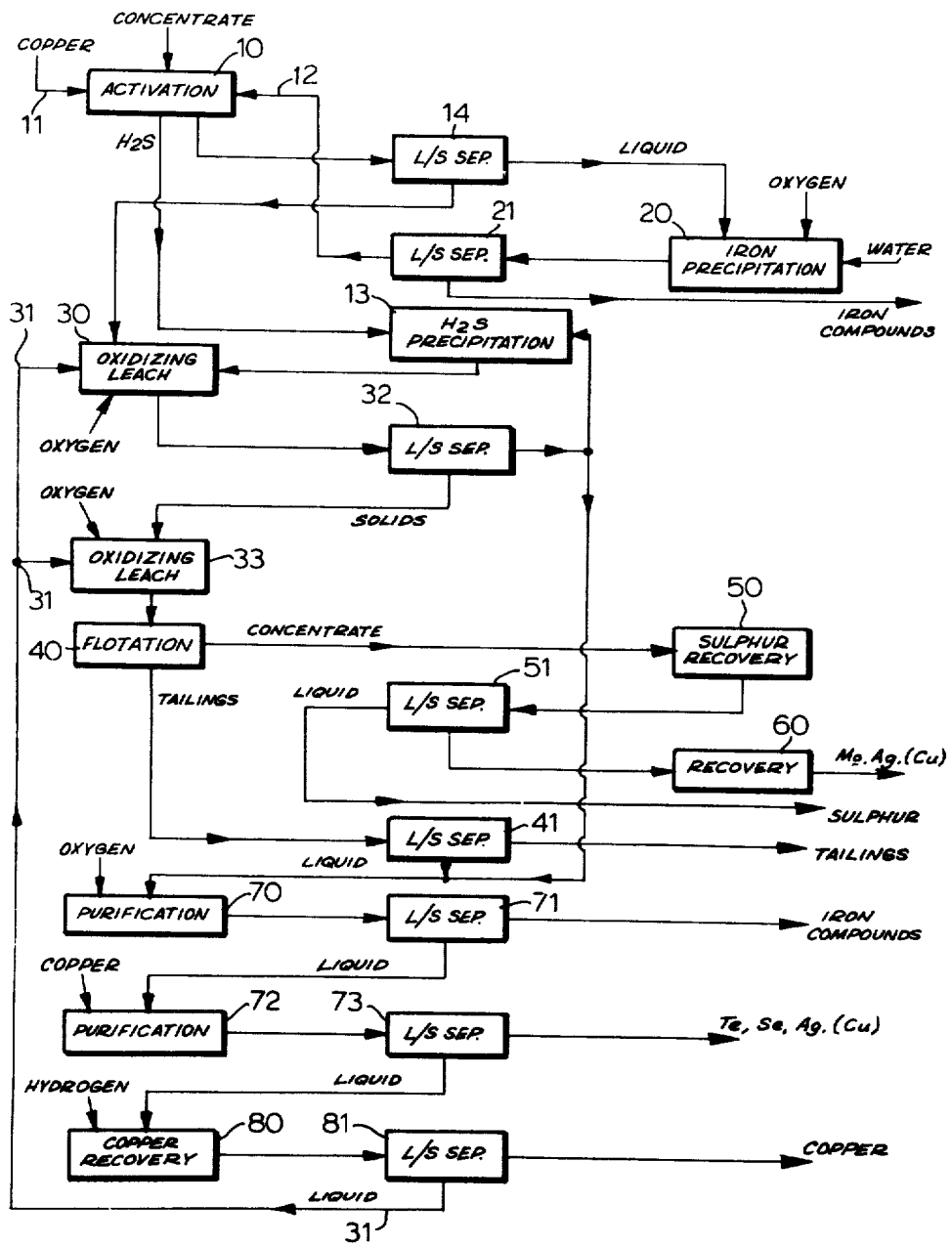

HYDROMETALLURGICAL PROCESS FOR TREATING COPPER-IRON SULPHIDES

This application is a continuation-in-part of application Ser. No. 229,737 filed Feb. 28, 1972 now abandoned.

BACKGROUND OF THE INVENTION

This invention relates to a process for treating copper-iron sulphides and, more particularly, is directed to a process for the activation of copper-iron sulphides and the hydrometallurgical extraction of copper values and sulphur in elemental form from said copper-iron sulphides.

Many processes have been developed for the hydrometallurgical extraction of copper values from complex sulphide ores and concentrates. For example, Canadian patent No. 520,252 teaches a process for the production of copper in powdered metallic form from copper-bearing ores containing sulphides of copper and iron. However, iron values substantially converted to dissolved sulphates by this process are not separately recovered and not only cause a loss of acid values but also pose disposal problems, with attendant pollution of the environment. Moreover, a significant portion of such iron values is not removed and not only leads to production of undesirable acid but remains to impede copper separation and sulphur recovery.

The production from pyrrhotitic-type ores of nonferrous metal values, elemental sulphur and iron oxide is disclosed in Canadian Pat. No. 547,012. Also, Canadian patent 808,108 shows a process for the extraction of copper values and the production of elemental sulphur from sulphides by direct oxidizing pressure leaching. In the processes of both the foregoing patents, iron is converted to iron oxide simultaneously with the conversion of copper to copper sulphate and the conversion of sulphide sulphur to elemental sulphur. As a result, the recovery of sulphur from the residue is impeded by the presence of the iron oxide.

Co-pending U.S. Pat. application Ser. No. 227,950, now U.S. Pat. 3,816,105, teaches a process for the hydrometallurgical treatment of copper-iron sulphides whereby subjecting the said sulphides to an activation leach results in conversion of copper values to simple insoluble copper sulphides and conversion of iron values to soluble ferrous sulphate such that the copper values can be substantially separated from the iron values and each metal component separately treated under conditions optimum for the respective component, without interference from the other, for high and efficient recoveries of copper values and the controlled production of sulphur in elemental form.

In accordance with the process described in the said co-pending application, copper-containing concentrate is subjected to an activation leach with an acidic solution containing copper sulphate whereby insoluble simple copper sulphides and a solution of ferrous sulphate are obtained. After a liquid-solids separation, for the effective separation of iron from copper values, the ferrous sulphate in the solution is oxidized and hydrolyzed to precipitate the iron, which is removed from the process, and to regenerate sulphuric acid. The copper sulphides are treated with an oxygen-bearing gas and with sulphuric acid solution in a multiple-stage oxidizing leach to oxidize the sulphide sulphur to elemental sulphur and to liberate the copper as cupric ion for subsequent recovery in elemental form.

SUMMARY OF THE INVENTION

We have found that the activation of the copper-iron sulphide concentrate surprisingly can be effectively accomplished by reacting the concentrate with metallic copper and an acidic solution containing sulphuric acid whereby insoluble simple copper sulphide and a solution of ferrous sulphate are obtained. This activation leach can be incorporated in processes for the recovery of values from copper-iron sulphide concentrates. For example, according to preferred embodiment of the process of the invention, the solution of ferrous sulphate is separated from the simple copper sulphide following activation and, after a liquid-solids separation, the iron in the solution is oxidized and hydrolyzed to precipitate the iron, which is removed from the process, and to regenerate an acidic solution of sulphuric acid which is recycled to the activation leach. The copper sulphide is treated with an oxygen-bearing gas and recovered sulphuric acid in a multiple-stage oxidizing leach to oxidize the sulphide sulphur to elemental sulphur and to liberate the copper as cupric ion. The residue of the last stage of the oxidizing leach is subjected to froth flotation to yield a concentrate containing elemental sulphur and sulphides, and a tailings product containing gangue and a copper-bearing solution. Elemental sulphur, metal sulphides containing molybdenum and silver, and precious metals, are recovered separately from the concentrate. The gangue is separated from the copper-bearing solution and discarded. The copper-bearing solution is fed to a purification operation to substantially remove the iron from the solution, to reduce residual ferric ion to ferrous ion and to remove selenium, tellurium and residual silver. After purification, the solution is subjected to a copper-recovery process, such as hydrogen reduction or electrolysis, from which elemental copper and sulphuric acid are separately recovered. The sulphuric acid solution is returned to the oxidizing leach as return acid. It will be understood, for clarity of description, that the term "acidic solution" used herein will refer to the solution of sulphuric acid produce in the iron-precipitation step and the term "return acid" used herein will refer to the solution containing sulphuric acid produced in the copper-recovery process.

It is a principal object of the process of the present invention to activate copper-iron sulphides to render copper values in such complex sulphide ores highly and selectively active for rapid and economic extraction and for production of high purity copper metal and elemental sulphur therefrom.

It is another object of the present invention to provide an integrated low temperature, low pressure hydrometallurgical process for the extraction of copper values and elemental sulphur from complex copper-iron sulphide ores.

Another object of the invention is to provide a hydrometallurgical process which is substantially self-sustaining with substantially no discharge of acid or sulphate values from the operation.

BRIEF DESCRIPTION OF THE DRAWING

The process will now be described in detail with reference to the accompanying flowsheet which schematically illustrates the relationship of the steps of the process.

DESCRIPTION OF THE PREFERRED EMBODIMENT

Concentrates processed according to the present invention have been obtained from copper-bearing ores which have been beneficiated according to well-known methods whereby the bulk of the undesirable gangue materials has been removed. The minerals present in the copper concentrates normally comprise copper-iron sulphides such as chalcopyrite and bornite, copper sulphides such as covellite, diginite and chalcocite, as well as precious metals such as silver and gold, and sulphides of other base metals such as iron, nickel, molybdenum, lead and zinc. Sulphide concentrates containing 7 to 41 percent copper and 14 to 31 percent iron have been successfully treated by our process.

The copper-containing concentrates are fed to the activation leach 10 in finely divided form, having at least 98 percent pass a 100 mesh screen, preferably a 325 mesh screen (Tyler series), to ensure satisfactory activation of the sulphide minerals. The concentrates can be added to the activation leach either as dry solids or in the form of a slurry with an aqueous solution or with water, the latter form being preferred because of water being added to the system, which is desirable in later stages of processing. It is understood that the activation leach can be used as a step in integrated processes for the recovery of values from copper-bearing ores which contain copper-iron sulphides, one of which processes will be described hereinbelow.

The copper-containing concentrates are treated in the activation leach with metallic copper 11 and an acidic solution 12 containing sulphuric acid. In this activation leach complex copper-iron sulphides are converted to simple insoluble copper sulphide and to ferrous sulphate which dissolves in the liquid phase with the evolution of hydrogen sulphide gas. Soluble iron in the sulphides is dissolved into solution as ferrous sulphate from which it can be recovered as a solid compound and whereby the copper in the sulphides is transformed into insoluble simple copper sulphide which will react completely and rapidly under subsequent oxidizing leaching conditions.

The principal reaction occurring in the activation leach can be illustrated for two complex copper-iron sulphide minerals, e.g. chalcopyrite and bornite, by following equations (1) and (2) respectively:

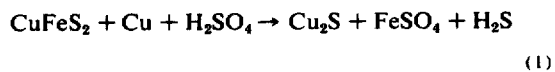

(1)

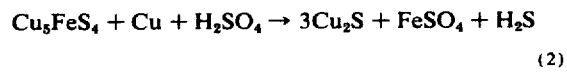

(2)

In these reactions the metallic copper acts as a reducing agent on the copper-iron sulphides with the formation of cuprous sulphide, ferrous ions and sulphide ions. The sulphide ions react with hydrogen ions of the acidic solution forming hydrogen sulphide. After a separation, the insoluble simple copper sulphide formed in these reactions may be readily oxidized while the iron can be separately treated. A secondary reaction, illustrated by equation (3), consumes some of the copper by reacting with hydrogen sulphide. The copper is converted to insoluble copper sulphide which must be treated to enable recovery of the copper

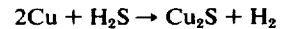

(3)

We have found that this reaction takes place only to a limited degree and the amount of copper consumed by this reaction is small.

The metallic copper 11, which is fed to the activation leach 10 can be from various sources. For example, copper scrap, cement copper, or copper produced by electrowinning and hydrogen reduction may be utilized with equal results. Regardless of its source, the copper must be in a finely divided form. A particle size of the copper smaller than 65 mesh (Tyler series) provides activation. For example, a particle size of about 150 mesh is satisfactory, but a particle size of 400 mesh or smaller is preferred.

The acidic solution 12 which is fed to the activation leach comprises sulphuric acid in a concentration in the range of from about 15 to 250 (g/l) grams per liter, preferably of from about 40 to 150 g/l. The acidic solution may also contain iron in an amount of from about 0 to 60 g/l in the form of ferrous and ferric sulphate, as well as small amounts of dissolved zinc, magnesium and calcium compounds.

There are a number of important variables in the process of the activation leach. The ratio of the amount of added metallic copper to the amount of soluble iron present in the concentrate controls the degree of dissolution of the soluble iron from the copper-containing concentrate, while the ratio of copper to iron in the solids-containing residue from the activation leach determines the amount of iron that passes on to the subsequent oxidizing leach as well as the activity of the solid residue.

The ratio of the added copper to the soluble iron in the concentrate is conveniently expressed as a molar ratio and a value of about unity provides a satisfactory degree of dissolution of the soluble iron from the concentrate. Values of the molar ratio above unity, i.e. using an excess of added copper, lead to unnecessary expense, although a slight excess may be desirable to allow for copper consumed in secondary reactions and to react with such metals as are present in the feed concentrate as sulphides which are more soluble than copper sulphide, such as for example zinc sulphide. The lower limiting value of the molar ratio is reached when either the activity of the solids-containing residue is not sufficient for a satisfactory oxidizing leach, or excess iron passes into the oxidizing leach.

The ratio of copper to iron in the form of iron sulphides, in the solids-containing residue from the activation leach expressed in a weight ratio, should be maintained at greater than 4:1 and preferably greater than 7:1 to ensure a sufficient activity of the solids.

The acidity in the activation step is another important variable. We have found that the activation leach can be carried out at a pH in the range of from about 0 to 2.0. We have also found that the acidity of the reaction mixture affects the separation of the solids from the liquid in the subsequent liquid-solids separation step and it affects removal of the dissolved iron from the leach solution in the subsequent iron precipitation step. At too high a pH, of above about 2, the solids in the reaction mixture are difficult to separate because of the formation of additional precipitates. A small amount of dissolved zinc normally will be present in solution and will react with hydrogen sulphide at a pH of about 1.2 to precipitate as ZnS. Also, some calcium carbonate and lime usually present in the concentrate will form gypsum, which will precipitate in a very fine form at a pH above 1. This ZnS and gypsum cause poor liquid-solids separation characteristics of the reaction mixture. On the other hand, at a pH of below about 0.5, the separation of iron from the leach solution in the subsequent iron precipitation step is impeded because of formation of undesirable complex iron compounds. For satisfactory separation of iron the pH should be maintained at about 2. A pH in the range of between about 0.5 and 2 is preferred and is a suitable compromise to meet both requirements for a good separation and a successful iron removal, a pH in the range of 1.0 to 1.5 being most preferred.

The retention time of the reaction mixture depends on the kind of concentrate which is being treated, as well as the rate with which the activation reaction proceeds and the desired degree of completion of the activation leach. A retention time in the order of from 1 hour to about 6 hours gives the desired results.

The activation leach is conducted at substantially atmospheric pressure or at the vapor pressure of the system at the reaction temperature, i.e. autogenous pressure. The activation leach is conducted at temperatures in the range of from about 60° to the boiling point of the reaction mixture, a temperature in the range of from about 90° to about 95°C. being preferred. Steam may be injected to maintain the temperature within the desired range. The reaction mixture is agitated sufficiently to maintain the solids in this mixture in suspension. The activation is conducted either batchwise or in a continuous fashion, the latter being preferred. Concentrate, acidic solution 12 and elemental copper 11 are added to the reaction mixture in a suitable reaction vessel. During the reaction a froth caused by the evolution of hydrogen sulphide gas forms on top of the reaction mixture. If so desired, means for breaking this froth may be provided, facilitating the release of the gas. These means may be one of a number well known in the art to obtain the desired effect, e.g. a spinning disc, or a spray of water, or steam.

A slurry, comprising activated solids and an acidic ferrous sulphate solution, and hydrogen sulphide gas are discharged from the reaction vessel. The hydrogen sulphide is recovered and may be processed according to one of a number of methods. The hydrogen sulphide gas may be absorbed in a copper sulphate solution with which it reacts to form a precipitate of copper sulphide, which is subsequently treated for the recovery of copper and sulphur. This embodiment of our process is shown in the drawing wherein the hydrogen sulphide is fed to precipitation step 13, reacted with a copper sulphate-containing solution and the reaction products are fed directly to the subsequent oxidizing leach 30. The copper sulphate-containing solution may be drawn from the solution obtained after the oxidizing leach to be described below. Alternatively, the hydrogen sulphide may be separately processed, for example by the Claus process, to produce elemental sulphur, or in an acid plant to produce sulphuric acid.

The solids in the slurry discharged from the activation leach reaction vessel contain, in addition to sulphides enriched in copper, compounds of silver, molybdenum and lead. The solids may contain an amount of copper of up to 65% by weight, depending on the degree of completion of the activation step, and on the amount of gangue materials and other metal sulphides present. The iron content of the solids likewise depends mainly on the degree of completion of the activation leach. We have found that by operating the activation step as described, the weight ratio of copper to iron in the solids in the reaction mixture will increase considerably, depending on the source of concentrate. For one type of concentrate this ratio increased to about 9:1 (corrected for elemental copper added) from a ratio of about 3:1 in the concentrate fed to the reaction vessel, while for another type of concentrate the ratio increased to 6.5:1 from 0.8:1.

The reaction mixture from the activation leach can be treated as follows. The discharged reaction mixture is subjected to a liquid-solids separation step 14. We have found that the solids in the mixture settle well and that it therefore is sufficient to feed the mixture to a settling tank or thickener wherein a good separation of the solid and liquid phases is obtained. The thickener underflow is fed to oxidizing leach 30. The thickener overflow, which will contain substantially all of the dissolved iron, may be further clarified, if so desired, before being directed to the iron precipitation step 20. It is noted that in the thickener of separation step 14 the hot solution may be concentrated by as much as 10% because of natural evaporation. The thickening and filtration are carried out by standard methods using acid-resistant equipment.

In the iron-precipitation step 20, the ferrous sulphate in the clarified solution from the liquid-solid separation step 14 is converted into an iron oxide and sulphuric acid by a combination of oxidation and hydrolysis reactions according to the following equations:

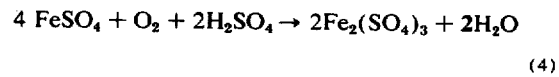

$$4\ FeSO_4 + O_2 + 2H_2SO_4 \rightarrow 2Fe_2(SO_4)_3 + 2H_2O \quad (4)$$

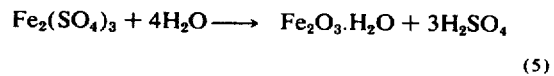

$$Fe_2(SO_4)_3 + 4H_2O \longrightarrow Fe_2O_3 \cdot H_2O + 3H_2SO_4 \quad (5)$$

The end product must be in an acceptable physical form to permit easy separation from the reaction mixture using conventional equipment. Moreover, the reaction must be carried out in such a way that loss of copper, e.g., by co-precipitation with the iron product, is kept to a minimum. As is well known in the art, the system $Fe_2O_3 - SO_3 - H_2O$ is complex and, unless well chosen conditions are applied to the conversion process, the end products may contain a mixture of iron compounds of variable composition. Some of these iron compounds are unstable and, if discarded, would cause environmental pollution.

The oxidation and hydrolysis reactions are carried out simultaneously, preferably in a continuous manner, in a reaction vessel. The iron-containing solution from the liquid-solids separation 14 is fed to this reaction vessel together with a sufficient amount of an oxygen-bearing gas to give an oxygen partial pressure in the range of from about 50 to about 200 pounds per square inch (p.s.i.). The contents of the reaction vessel are maintained at a temperature of above about 180°C., preferably in the range of from about 180° to about 230°C.

The temperature at which the reactions are conducted is important for the composition as well as for the physical form of the iron-containing reaction product which is obtained. Temperatures below 180°C. will give reaction products such as basic iron sulphates which are difficult to settle or filter and which result in a loss of useful sulphate. To obtain a stable reaction product in the precipitation step it is also necessary to control the amount of iron being fed to the reaction vessel.

It will be evident from the flowsheet that the iron circuit, comprising the dissolution of the iron in the activation 10, the separation 14 from the copper sulphides, the precipitation 20 from the solution and the separation 21 of solid iron compounds from the acidic solution 12, is independent from the remainder of the flowsheet with regard to iron because no iron and/or copper-containing solutions are recycled from the rest of the process to this circuit. We are, therefore, free to choose the iron concentration of the solution which is to be treated.

We have found that by controlling the concentration of iron in the solution fed to the iron precipitation 20 at not more than 40 g/l, under the conditions of temperature and pressure as discussed above, iron can be precipitated mainly as stable iron oxide in a one-stage precipitation 20. The concentration of iron may be maintained at this level by the addition or removal of water from the solution fed to the reaction vessel of the iron precipitation 20.

The amount of water, if added, must be controlled to maintain a proper balance of water in the total process. Water is introduced into the process by way of the feed concentrate slurry, washwater used on filters and the addition to the iron precipitation operation. Water is removed by natural evaporation and with the various product streams leaving the process. In case of the presence of excess water, evaporation from a bypass stream, not shown, following the subsequent liquid-solids separation 21 is convenient to maintain the balance.

If the iron concentration in the solution is higher than 40 g/l the precipitated iron compounds will contain basic sulphate compounds. In this case, the precipitated iron compounds are subjected, after separation from the liquid phase, to a second oxidation and hydrolysis treatment, not shown, at similar temperature and pressure to reclaim further sulphate values.

The oxidation and hydrolysis treatment may be carried out in the presence of ammonium or alkali-metal compounds, such as for example ammonium hydroxide, sodium hydroxide or sodium sulphate, whereby the iron and sulphate are precipitated as jarosite.

The liquid phase from the separation step 21 comprises acidic solution 12 which is returned to the activation leach 10. This solution contains sulphuric acid in an amount of from about 20 to 75 g/l $H_2SO_4$, a minor amount of both ferrous and ferric ion and all other ions present in the feed to the iron precipitation step. Because the ferric ion contained in solution will react with elemental copper in the activation leach, it may be desirable to reduce the ferric ion to the ferrous state prior to feeding the solution to the activation leach.

The solids fraction from the liquid-solids separation step 14 is repulped, not shown, with return acid 31 which is recovered in the subsequent copper recovery steps and the pulp is fed to a multiple-stage oxidizing leach wherein the activated solids are reacted with an oxygen-bearing gas such as air, oxygen and mixtures thereof to oxidize the sulphide sulphur to elemental sulphur and to bring the copper into solution as copper sulphate.

The accompanying flowsheet illustrates the oxidizing leach for a leach in two stages, 30 and 33 respectively. The discharge from the first-stage oxidizing leach 30 is subjected to a liquid-solids separation 32. The solids from this separation are fed to the second-stage oxidizing leach 33, while the liquid is fed to a subsequent purification operation. It will be understood that in an operation with more than two stages, the oxidizing leach 30 and liquid-solids separation 32 may be repeated to provide, in combination with the last stage, the desired number of stages. It is advantageous to conduct the oxidizing leach in a continuous manner and the leach may be conducted in series, counter-current or cross-current fashion.

The overall reaction taking place in the oxidizing leach can be represented by the reacton equation:

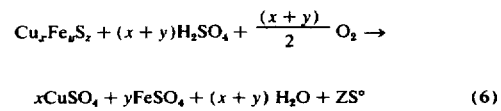

$$xCuSO_4 + yFeSO_4 + (x+y) H_2O + ZS° \qquad (6)$$

wherein $x$, $y$ and $z$ have values in combination covering the various copper sulphides and copper-iron sulphides. It is to be noted that under the prevailing oxidizing conditions, the ferrous sulphate is usually at least partially oxidized to ferric sulphate. For example, equation 6 can be written as equation (7) for $Cu_2S$, wherein $x$ has the value 2, $y$ has the value 0 and $z$ has the value 1:

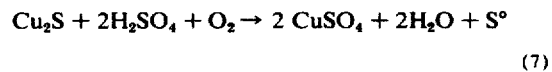

(7)

Other copper-containing sulphides which are present in the solids fraction, such as for example residual chalcopyrite, also may be oxidized with formation of cupric sulphate, a mixture of ferrous and ferric sulphate and elemental sulphur, while some sulphur is oxidized to sulphate. Sulphides such as those of silver, molybdenum and iron, i.e. pyrite and precious metals, are not dissolved and remain as solids in the residue together with the gauge materials and elemental sulphur.

The oxidizing leach according to the process of the present invention, as follows from the main reaction represented by equation (7), produces cupric sulphate in solution and a precipitate of elemental sulphur, while only a minor amount of ferrous and ferric sulphate is formed. In this, our process is significantly different from other oxidizing leach processes which do not first realize a substantially complete separation of the soluble iron compounds from the copper. Such other processes oxidize and hydrolyse the iron compounds in situ to basic sulphates and hydroxides or hydrated oxides which are difficult to separate from the copper sulphate solution while, moreover, the recovery of sulphur from the mixture of sulphur and precipitated iron compounds is difficult to achieve. Still other processes do not produce sulphur in elemental form but oxidize the sulphur to sulphate. After the recovery of copper, this sulphate is recovered in the form of sulphuric acid which is recirculated and which creates an excess acid in the circuit which must necessarily be removed.

The solids fraction from the liquid-solids separation 14 which is fed to the oxidizing leach 30 usually comprises a slurry containing at least 50 percent solids with up to 65 percent by weight copper content. The amount of liquid in the slurry should be kept at a minimum because the liquid will contain dissolved iron which may interfere in subsequent process steps and which consequently must be removed to allow efficient recovery of the copper. Also, excess amount of the liquid must be removed to prevent a build-up of the liquid circulating load and this removal of liquid requires an additional step for the recovery of copper therefrom. The return acid 31, which is returned from the subsequent copper recovery step and which is fed to each stage of the oxidizing leach, contains from about 40 to 120 g/l $H_2SO_4$, from about 0 to 40 g/l cupric ions and from about 0 to 10 g/l ferrous ions. The composition of the return acid will depend largely on the methods of copper recovery used. If, for example, hydrogen reduction is employed, the return acid may contain from about 100 to 110 g/l sulphuric acid, from about 10 to 25 g/l copper as cupric ions and from about 1 to 5 g/l iron as ferrous ions.

The operating parameters under which the oxidizing leach is performed are highly critical. The most critical operating parameter is the temperature. We have found that at temperatures above 100°C. the oxidation reaction proceeds initially at a high rate but this rate decreases sharply with time. We believe that this reduction in the reaction rate is due to the activity of the solids and the exothermic nature of the reaction which causes localized overheating with consequent melting of sulphur. The moltern sulphur blinds the surface of the particles thereby preventing continuing oxidation.

We have found that the temperature to achieve a good rate of extraction at a satisfactory efficiency is in the range of from about 70° to about 110°C. The limiting temperature is that temperature at which the iron in solution starts to hydrolyze and precipitate with an associated loss of silver and molybdenum.

We have also found that by maintaining the temperature in the first, or earlier stages, of the oxidizing leach in the lower end of the range, i.e., within the range of from about 70° to 100°C., the blinding of particle surfaces is effectively prevented, while the temperature in the later, or last, stages of the leach may be maintained in the higher end of the range, i.e., within the range of about 90° to 110°C.

The oxidizing leach can be performed under a wide range of pressures. We have found that in the presence of an oxygen-containing gas pressure in the oxidizing leach may be up to about 400 p.s.i. to provide satisfactory extractions. Pressures above 400 p.s.i., although effective, require high-pressure equipment necessitating additional capital cost. Thus, it is possible to conduct the oxidizing leach with an oxygen-bearing gas under pressures in the range of from about atmospheric to about 400 p.s.i.

An effective oxidizing leach can be obtained by maintaining the pressure in the first, or earlier, stages of the oxidizing leach in the lower end of the above-stated pressure range, while maintaining the pressure in the later, or last stages in the higher end of the disclosed range. For example, we have found that a substantial portion of the copper sulphides will be oxidized in the presence of an oxygen bearing gas in the first-stage oxidizing leach wherein the pressure is substantially atmospheric pressure. It is preferred to maintain the pressure in the first, or earlier stages of the oxidizing leach, in the range of from substantially atmospheric to about 200 p.s.i. and to maintain the pressure in the last, or later stages, in the range of from about 200 to about 400 p.s.i.

The retention time of the reaction mixture in each of the stages of the oxidizing leach may vary within a broad range and is dependent not only on the required extraction in each stage but also on the conditions in each stage. Thus we have found that at lower temperatures and pressures the retention time may be between 2 and 48 hours, while at higher temperatures and pressures the retention time may vary between 30 minutes and 12 hours.

The acidity of the reaction mixture in the oxidizing leach is critical and must be carefully controlled to ensure a high dissolution of the copper as well as to prevent the precipitation of iron compounds and associted loss of silver and molybdenum. If the pH of the reaction mixture rises too high, the iron in the solution will hydrolyse and precipitate, and the valuable silver and molybdenum which are present in the reaction mixture will be occluded by this precipitate and will leave the process in the tailings from the subsequent flotation step. The acidity is controlled so as to prevent iron precipitation. We have found that a residual free acid content of about 1 g/l for each 1 g/l iron is desirable. When operating the oxidizing leach with this free acid content and at 100°C., the loss of silver and molybdenum are effectively prevented.

The final concentration of copper in the solution from the oxidizing leach is maintained below the point at which the crystallization of copper sulphate occurs. The solution may contain up to 90 g/l copper as cupric ion and from about 3 to 10 g/l iron. The leach residue contains gangue, residual metal sulphides, precious metals and elemental sulphur.

The discharge from the oxidizing leach 33 is passed directly to a froth flotation operation 40, wherein the elemental sulphur, residual metal sulphides and precious metals are separated from the gangue materials and solution. This flotation also results in a very effective liquid-solids separation, i.e., only a small amount of dissolved copper in the solution is removed in the froth containing the sulphur, metal sulphides and precious metals. By using a collector for sulphur such as an organic dithiophosphate, a flotation concentrate is obtained which contains the elemental suphur, as well as substantially all of the silver and molybdenum as sulphides, precious metals, iron compounds and unleached copper sulphides, as well as some gangue materials. The flotation concentrate contains a very high amount of sulphur which makes it possible to effectively recover the elemental sulphur. We have found that the concentrate may contain up to 85 percent S° by weight. If so desired, the flotation concentrate may be subjected to a liquid-solids separation and the solids washed to recover additional dissolved copper values. The elemental sulphur is separated from the sulphides in a sulphur recovery step 50 followed by a liquid-solids separation 51. This recovery can be accomplished using one of a number of methods. Because of the very high concentration of sulphur, a convenient and efficient method is to heat the concentrate above the melting point of sulphur, separating the molten sulphur in liquid-solids separation 51 by a convenient method such as filtration, and recovering the sulphur. The residue of the concentrate after separation of the sulphur may be treated in a recovery step 60 to recover the copper, molybdenum, silver and other precious metals.

The flotation tailings, which contain the copper solution and the insoluble non-sulphide gangue materials, such as silicates and magnetite from the feed concentrate, are subjected to a liquid-solids separation 41 to separate the copper bearing solution from the solids. Conventional settling and vacuum filtration followed by washing are satisfactory to remove any copper from the tailings, which are discarded after neutralization of the acid content. The resulting copper bearing solution is combined with the liquid portion from the liquid-solids separation step 32. This combined solution contains about 20 to 80 g/l copper as cupric ions, about 5 to 25 g/l sulphuric acid and about 3 to 15 g/l iron as ferrous and ferric iron. The combined solution is then treated in a purification operation.

In the purification, at least a portion of the iron is removed to maintain the concentration of iron in the circuit at a predetermined low level while the iron in the remaining portion present in the ferric state must be reduced to the ferrous state. Residual silver, as well as selenium and tellurium are simultaneously precipitated in the purification and can be recovered.

It is advantageous to conduct the purification step in two stages, as illustrated. In the first purification stage 70, the iron in solution is precipitated in a manner as described above in connection with the iron-precipitation step 20. The iron in solution is oxidized and hydrolysed continuously at a temperature of above 160°C., preferably in the range of from about 180° to 230°C., under a partial pressure of oxygen in the range of from about 50 to 200 p.s.i. The retention time is 30 minutes or less. After a liquid-solids separation 71 to remove the precipitated iron compounds, copper powder is added to the liquid fraction in the second-stage purification and the solution is separated from the copper powder with the precipitated elements in liquid-solids separation 73, usually be filtration. The residue containing silver, selenium, tellurium and copper may be further treated to recover these valuable constituents.

The purified solution from liquid-solids separation 73 is fed to a recovery step 80 wherein elemental copper is precipitated from the solution. For recovery of copper from the purified solution any one of a number of well known methods may be employed, such as electrowinning, chemical precipitation with subsequent reduction, or direct reduction with a reducing gas. We have found that direct reduction with hydrogen gas at elevated temperature and pressure in a continuous fashion is very rapid and offers significant economic advantages over other methods. The reaction is conducted in a reaction vessel at a temperature of about 180°C., under a pressure of about 450 p.s.i. and with agitation. The retention time required for the reduction of the cupric sulphate solution is in the order of several minutes, e.g. 5 minutes.

The purified solution from the liquid-solids separation 73 may contain from about 25 to 80 g/l copper as cupric ions, from 5 to 25 g/l sulphuric acid and from a tract to 10 g/l iron as ferrous ions. When employing direct reduction of the solution with hydrogen to recover elemental copper, this solution contains usually from about 50 to 80 g/l cupric ions, from about 10 to 20 g/l sulphuric acid and only from about 2 to 4 g/l iron. The discharge from the reaction vessel is treated in a liquid-solids separation 81 to separate the precipitated copper powder from the liquid. A portion of the copper powder may be returned directly to the activation leach 10, while the remaining portion is dried and sintered in an atmosphere of hydrogen and recovered as final product. The liquid is return acid 31 which is fed to each stage of the oxidizing leach in an amount as required. This return acid contains from about 100 to 110 g/l sulphuric acid, from about 10 to 25 g/l copper as cupric ions and from about 0 to 10 g/l iron as ferrous ions.

As is obvious from the high copper content of the return acid, the copper fed to the recovery step is only partially removed. Because it is possible in the process according to the present invention to recycle the residual solution from the recovery to the oxidizing leach, it is not necessary to recover the maximum amount of copper from the solution. The recovery step can therefore be designed for optimum conditions to yield the most economical results.

In order to prevent the build-up of concentrations of minor elements, such as magnesium, or zinc, and sulphate ions in the process, it is necessary to provide one or more bleed-stream at any convenient place, or places. The amount of bleed depends on the amounts of magnesium and zinc in the concentrate; generally a circulating load of Mg++ and Zn++ in the process of about 20 to 30 g/l has been found acceptable. Any copper which is present in the bleedstreams is recovered, for example, by chemical precipitation or cementation on iron. The residual solution may be further treated to recover other values, or may be discarded after neutralization of the acid content to prevent pollution.

The process of our invention will now be described with reference to the following examples:

EXAMPLE 1

A copper concentrate containing major portions of chalcopyrite and bornite was ground to about 99 percent minus 325 mesh (Tyler Screen Series) and had a composition comprising 40.8 percent copper, 13.8 percent iron, 22.4 percent sulphur, the remainder mostly gangue. 1,000 grams of this ground concentrate were suspended in 4 litres of an acidic solution obtained from an iron precipitation which contained 65 g/l sulphuric acid and 10 g/l iron as ferrous sulphate. The suspension was heated to 95°C. and 157 grams of electrolytic copper in finely divided elemental form, i.e. minus 400 mesh, were slowly added over a period of 5 hours. During this period hydrogen sulphide gas was evolved which formed a layer of foam on top of the reaction mixture. A spinning disc was used in this foam layer to facilitate the release of the gas.

After the specified period, the solids residue was separated from the solution by filtration. The solids loadings in the copper circuit are substantially reduced. The small amount of residual iron which enters the copper circuit does not interfere with the recovery of copper and is easily eliminated, if desired. The complete oxidation of the solids makes it possible to convert the sulphur into its elemental form in such a high concentration that an effective recovery by pelletization or filtration can be used. The conversion of substantially all the sulphur in the process into the elemental form not only yields a valuable byproduct but avoids circulating large volumes of sulphuric acid and also avoids the necessity of removal of excess acid from the process. Treating the soluble iron in a separate circuit makes it possible to recover an iron-containing product which does not include occluded copper, silver and other valuable materials. The iron is recovered in such a way that the iron-containing product cannot be a source of pollution, while an acidic solution is regenerated for use in the process.

What I claim as new and desire to protect by Letters Patent of the United States is:

1. A process for treating copper-iron sulphide concentrate for the recovery of copper and sulphur values which comprises leaching copper-iron sulphide concentrate with an acidic solution containing sulphuric acid in a concentration in the range of from about 15 g/l to about 250 g/l and metallic copper having a particle size smaller than 65 mesh to convert the copper-iron sulphides in said concentrate to insoluble simple copper sulphide and a solution of ferrous sulphate and recovering copper and sulphur values from said simple copper sulphide.

2. A process as claimed in claim 1, wherein said leaching is carried out at a temperature in the range of from about 60°C. to the boiling point of the reaction mixture.

3. A process as claimed in claim 1, wherein the molar ratio of metallic copper to soluble iron in said concentrate is maintained at a value of about unity.

4. A process as claimed in claim 1, wherein the copper-iron sulphides in said concentrate are reacted with said acidic solution and metallic copper at a pH in the range of from about 0 to 2.0.

5. A process as claimed in claim 1, wherein the acidic solution contains sulphuric acid in a concentration in the range of from about 40 to about 150 g/l.

6. A process as claimed in claim 1, wherein the metallic copper has a particle size smaller than 400 mesh.

7. A process as claimed in claim 1, wherein said concentrate has a particle size such that at least 98 percent of said concentrate pass a 100 mesh screen.

8. A process as claimed in claim 1, wherein said concentrate is leached with the acidic solution and metallic copper at the vapour pressure of the reaction system at the reaction temperature.

9. A process for treating copper-iron sulphide concentrate to extract copper values and elemental sulphur therefrom which comprises the steps of:

1. reacting said concentrate sulphide with an acidic solution containing sulphuric acid in a concentration in the range of from about 15 to 250 grams per litre and metallic copper having a particle size smaller than 65 mesh in an activation leach at a temperature in the range of from about 60°C. to the boiling point of the reaction mixture, and maintaining the amount of metallic copper to soluble iron at a molar ratio of about unity, for the production of an insoluble simple copper sulphide and a solution of ferrous sulphate;

2. separating the solution of ferrous sulphate from the insoluble copper sulphide;

3. concurrently oxidizing and hydrolyzing the ferrous sulphate for the precipitation of iron compounds and the regeneration of acidic solution containing sulphuric acid;

4. separating the precipitated iron compounds from the regenerated acidic solution;

5. returning regenerated acidic solution to said activation leach;

6. subjecting the insoluble copper sulphide to an oxidizing leach for oxidation of sulphide sulphur to elemental sulphur and for dissolution of copper as cupric ion to form a copper-bearing solution;

7. discharging a mixture of copper-bearing solution, elemental sulphur and residual solids from the oxidizing leach; and 8. recovering copper values from said copper-bearing solution.

10. In a process as claimed in claim 9, reacting the copper-iron sulphides in said concentrate with said acidic solution and metallic copper at a pH in the range of from about 0.5 to about 2.0.

11. In a process as claimed in claim 9, reacting the copper-iron sulphides in said concentrate with said acidic solution and metallic copper at a pH in the range of from about 1.0 to about 1.5.

12. In a process as claimed in claim 9, reacting the copper-iron sulphides in said concentrate with said acidic solution and metallic copper at the vapour pressure of the system at the reaction temperature.

13. In a process a claimed in claim 9, reacting the copper-iron sulphides in said concentrate with said acidic solution and metallic copper at a temperature within the range of from about 90° to about 95°C.

14. A process as claimed in claim 9, in which said concentrate has a particle size such that at least 98 percent of said concentrate pass a 100 mesh screen.

15. A process as claimed in claim 14, in which the metallic copper is selected from the group consisting of scrap copper, cement copper, electrolytic copper and hydrogen reduced copper and has a particle size smaller than 150 mesh.

16. A process as claimed in claim 9, in which the metallic copper has a particle size smaller than 400 mesh.

17. A process as claimed in claim 9, in which the metallic copper is selected from the group consisting of scrap copper, cement copper, electrolytic copper and hydrogen reduced copper.

18. A process as claimed in claim 9, in which residue from the activation leach has a copper to iron weight ratio of at least 4:1.

19. A process as claimed in claim 9, in which residue from the activation leach has a copper to iron weight ratio of at least 7:1.

20. A process as claimed in claim 9, in which hydrogen sulphide evolved in the activation leach is absorbed in copper-bearing solution from the oxidizing leach.

21. In a process as claimed in claim 9, oxidizing and hydrolysing the ferrous sulphate at a temperature in the range of from about 180° to about 230°C. and a pressure in the range of from about 50 p.s.i. to about 200 p.s.i.

22. In a process as claimed in claim 21, controlling the ferrous iron concentration in the solution fed to the weighed 1,084 grams and contained 52.1 percent copper, 4.3 percent iron and 16.5 percent sulphur.

It will be evident from the above data that the molar ratio of added elemental copper to soluble iron in the concentrate was unity, that the weight ratio of copper to iron in the solids residue was 12, that all copper which was present in the concentrate and that which was added reported in the solids residue, and that 66 percent of the iron had been dissolved from the concentrate.

The solution was treated in an autoclave at 200°C. and at 200 p.s.i. partial pressure of oxygen, whereby the iron was precipitated and an acidic solution was obtained. The solids residue was suspended in 12 litres of return acid obtained from the reduction with hydrogen of a copper sulphate containing solution. The return acid contained 20.5 g/l copper, 3 g/l iron in the form of ferrous ions and 109 g/l sulphuric acid. The solids residue suspended in the return acid was subjected to a first-stage oxidizing leach in an autoclave at a temperature of 95°C. and at an oxygen partial pressure of 200 p.s.i. The pH of the leach was 1.5. After 30 minutes, the residue was separated from the solution which analyzed 64.1 g/l copper and 5.1 g/l total iron.

The residue from the first-stage leach was suspended in 3 litres return acid and treated in the second stage at 95°C. at a partial pressure of oxygen of 80 p.s.i. for a period of 5 hours. The pH in the leach was less than one.

The material discharged from the second-stage oxidizing leach was subjected to flotation using "Aerofloat 25" (trade mark) as collector. The flotation concentrate weighed 258 grams and contained 1.2 percent copper, 0.8 percent iron and 74 percent elemental sulphur. From this concentrate was recovered 190 grams of sulphur in elemental form, while the residue weighing 68 grams contained 4 percent copper, 4.1 percent iron, 3.1 percent total sulphur, 1 percent elemental sulphur as well as about 90 percent of the molybdenum sulphide and silver which were originally present in the concentrate.

After separation of the solution from the tailings, the solids in the tailings, weighing 236 grams, contained 0.1% copper and 0.3 percent iron, the remainder being mainly silicates. The solution from the tailings, which contained 27.7 g/l copper and 13.4 g/l iron was combined with the solution from the first stage oxidizing leach. The combined solution was subjected to a purification whereby the iron content of the solution was reduced to 3 g/l. The purified solution was reduced with hydrogen in an autoclave at 200°C. and 450 p.s.i. to recover a major portion of the copper in metallic form, while the residual solution was recirculated as return acid to the oxidizing leach.

EXAMPLE 2

A copper concentrate containing a major portion of chalcopyrite and minor portions of bornite and pyrite was ground to about 99 percent minus 325 mesh and had a composition comprising 25.5 percent copper, 30.9 percent iron and 30.8 percent sulphur.

1,000 grams of this ground concentrate were suspended in 8.8 litres of an acidic solution obtained from an iron precipitation which contained 65 g/l sulphuric acid and 10 g/l iron as ferrous sulphate. The suspension was heated to 95°C. and 353 grams of copper powder obtained by hydrogen reduction of a copper bearing solution and having particle sizes less than 400 mesh Tyler screen was added over a period of 4 hours. The foam layer, formed by the evolving hydrogen sulphide gas, was sprayed with water to facilitate the release of the gas.

After the specified period, the solids residue was separated from the solution by filtration. The solids weighed 962 grams and contained 63.2 percent copper, 4.1 percent iron and 18.1 percent sulphur.

It will be evident from the above data that the molar ratio of added metallic copper to iron in the concentrate was unity, that the weight ratio of copper to iron in the solids residue was 15.4, that all copper present reported in the solids residue, and that 87.2 percent of the iron had been dissolved from the concentrate.

The solids residue was suspended in 9.5 litres of return acid, obtained from the hydrogen reduction of a copper sulphate containing solution. The return acid contained 20.2 g/l copper, 2.9 g/l iron as ferrous ions and 108 g/l sulphuric acid. The suspended residue was subjected to a first-stage oxidizing leach at a temperature of 90°C. and at an oxygen partial pressure of 200 p.s.i. The pH of the leach was about 1.5. After 45 minutes the residue was separated from the solution and subjected to a second-stage oxidizing leach, after suspension in 5 litres return acid, for 2 hours at 90°C. under a partial pressure of oxygen of 200 p.s.i. The pH in the second stage leach was below one. The solution from the first stage leach analyzed 79.5 g/l copper, 3.5 g/l total iron and 16.8 g/l sulphuric acid.

The material discharged from the second-stage oxidizing leach was subjected to flotation using "Aerofloat 25" (trade mark) as collector. The flotation concentrate weighed 201 grams and contained 4.2 percent copper, 10.3 percent iron, 65.7 percent elemental sulphur and 8.5 percent sulphide sulphur. After a liquid-solids separation, 132 grams of sulphur in elemental form was removed from the solid concentrate. The residue, weighing 60 grams contained 1% elemental sulphur, all the copper, iron and sulphide sulphur from the flotation concentrate, as well as 90 percent of the molybdenum and silver present in the copper concentrate.

After separation of the solution from the tailings, the solids, weighing 78 grams, contained 0.1 percent copper, 3.1 percent iron and 3.8 percent total sulphur, the remainder being mainly silicates. The solution from the tailings, which contained 28.1 g/l copper and 9.0 g/l iron, was combined with the solution from the first-stage oxidizing leach. The combined solution, containing 61.5 g/l copper and 6.9 g/l iron, was treated for the removal of iron and the purified solution, containing 61.5 g/l copper and 2.9 g/l iron was subjected to a reduction with hydrogen at 200°C. and at 450 p.s.i., wherein copper was precipitated as metallic copper and return acid was obtained, which was recirculated to the two stages of the oxidizing leach.

The process according to the present invention offers a number of important advantages over known processes. The present process provides for a distinct separation of copper from soluble iron in the concentrate in the first process step, i.e. the activation leach, permitting the subsequent treatment of the copper and the iron in separate circuits. The residual solids obtained from the activation leach contains substantially all the copper and can be oxidized completely. The treatment of copper and iron together is substantially eliminated, hence the requirements for equipment and material oxidizing and hydrolysing step at not more than 40 grams per litre.

23. In a process as claimed in claim 21, oxidizing and hydrolysing the ferrous sulphate in the present of ammonium or alkali metal compounds whereby the ferrous sulphate is precipitated as jarosite.

24. In a process as claimed in claim 23, said ammonium or alkali metal compounds selected from the group consisting of ammonium hydroxide, sodium hydroxide and sodium sulphate.

25. In a process as claimed in claim 9, subjecting the insoluble copper sulphide to a multiple-stage oxidizing leach at a pressure up to about 400 p.s.i.

26. In a process as claimed in claim 9, subjecting the insoluble copper sulphide to a multiple-stage oxidizing leach at a temperature in the range of from about 70° to about 110°C.

27. In a process as claimed in claim 26, maintaining the first-stage oxidizing leach at a pressure in the range of from about atmospheric to about 300 p.s.i. and the last-stage oxidizing leach at a pressure in the range of from about 200 to about 400 p.s.i.

28. In a process as claimed in claim 26, maintaining the first-stage oxidizing leach at a temperature in the range of from about 70° to about 100°C., and maintaining the last-stage oxidizing leach at a temperature in the range of from about 90° to 110°C.

29. In a process as claimed in claim 9, floating elemental sulphur and sulphides from the mixture discharged from the oxidizing leach to produce a concentrate containing elemental sulphur, metal sulphides and precious metals.

30. In a process as claimed in claim 29, separating the elemental sulphur from the metal sulphides and precious metals.

31. In a process as claimed in claim 9, reducing the ferric iron in the copper-bearing solution to ferrous iron and subjecting the resultant solution to hydrogen reduction for production of metallic copper and return acid.

32. In a process as claimed in claim 31, returning said return acid produced in the hydrogen reduction to the oxidizing leach.

33. A process as claimed in claim 32, said return acid containing not more than 10 grams per litre iron.

34. A process as claimed in claim 9, wherein the acidic solution contains sulphuric acid in a concentration in the range of from about 40 to about 150 g/l.

35. In a process as claimed in claim 9, recovering copper values from said copper-bearing solution by electrowinning for the production of metallic copper and return acid.

36. In a process as claimed in claim 35, returning said return acid produced by electrowinning to the oxidizing leach.

37. A process as claimed in claim 36, said return said containing not more than 10 grams per litre iron.

* * * * *